United States Patent
Huang et al.

(10) Patent No.: US 12,279,618 B2
(45) Date of Patent: Apr. 22, 2025

(54) USE OF DIHYDROPORPHIN DERIVED FROM CHLOROPHYLL AS PLANT GROWTH REGULATOR

(71) Applicant: Anqing Better Bioengineering Co., Ltd, Anhui Province (CN)

(72) Inventors: Junhai Huang, Shanghai (CN); Liming Chen, Nanjing (CN); Letian Wang, Nanjing (CN); Dongfeng Meng, Nanjing (CN); Ming Li, Shanghai (CN); Jin Hu, Shanghai (CN); Yong Ren, Nanjing (CN)

(73) Assignee: ANQING BETTER BIOENGINEERING CO., LTD, Anqing (CN)

( * ) Notice: Subject to any disclaimer, the term of this patent is extended or adjusted under 35 U.S.C. 154(b) by 589 days.

(21) Appl. No.: 17/622,677

(22) PCT Filed: Jun. 27, 2019

(86) PCT No.: PCT/CN2019/093380
§ 371 (c)(1),
(2) Date: Dec. 23, 2021

(87) PCT Pub. No.: WO2020/258190
PCT Pub. Date: Dec. 30, 2020

(65) Prior Publication Data
US 2022/0248677 A1    Aug. 11, 2022

(51) Int. Cl.
*A01N 43/90*    (2006.01)
(52) U.S. Cl.
CPC .................................. *A01N 43/90* (2013.01)

(58) Field of Classification Search
CPC .......... A01N 43/90; Y02A 40/10; A01P 21/00
See application file for complete search history.

(56) References Cited

FOREIGN PATENT DOCUMENTS

| | | |
|---|---|---|
| CM | 102285992 | 12/2011 |
| CN | 102068436 | 5/2011 |
| CN | 102125549 | 7/2011 |
| CN | 102273467 | 12/2011 |
| CN | 109329291 | 2/2019 |
| JP | 2-306908 A | 12/1990 |

OTHER PUBLICATIONS

International Search report for PCT/CN2019/093380, mailed Mar. 27, 2020.

*Primary Examiner* — Zohreh A Fay
(74) *Attorney, Agent, or Firm* — McDonnell Boehnen Hilbert & Berghoff LLP

(57) ABSTRACT

Disclosed is the use of dihydroporphin derived from chlorophyll as a plant growth regulator. Compared with the prior art, a class of new type plant growth regulators are provided; since the direct decomposition product of chlorophyll is used as a product, the preparation and processing thereof are easier, the structure is relatively simple, and tedious reactions and preparations such as further chemical coordination/chelation/purification are eliminated, so that the product is more environmentally friendly and safer; the product has a better solubility than the corresponding metal chelate and has a more convenient method of use, making it more convenient to be used in the fields; the stability of the product has been improved, with stable quality assurance and a longer shelf life; the product has a natural source and uses a low amount of same due to a low effective dosage, thereby improving the utilization rate of silkworm excrement resources.

9 Claims, 1 Drawing Sheet

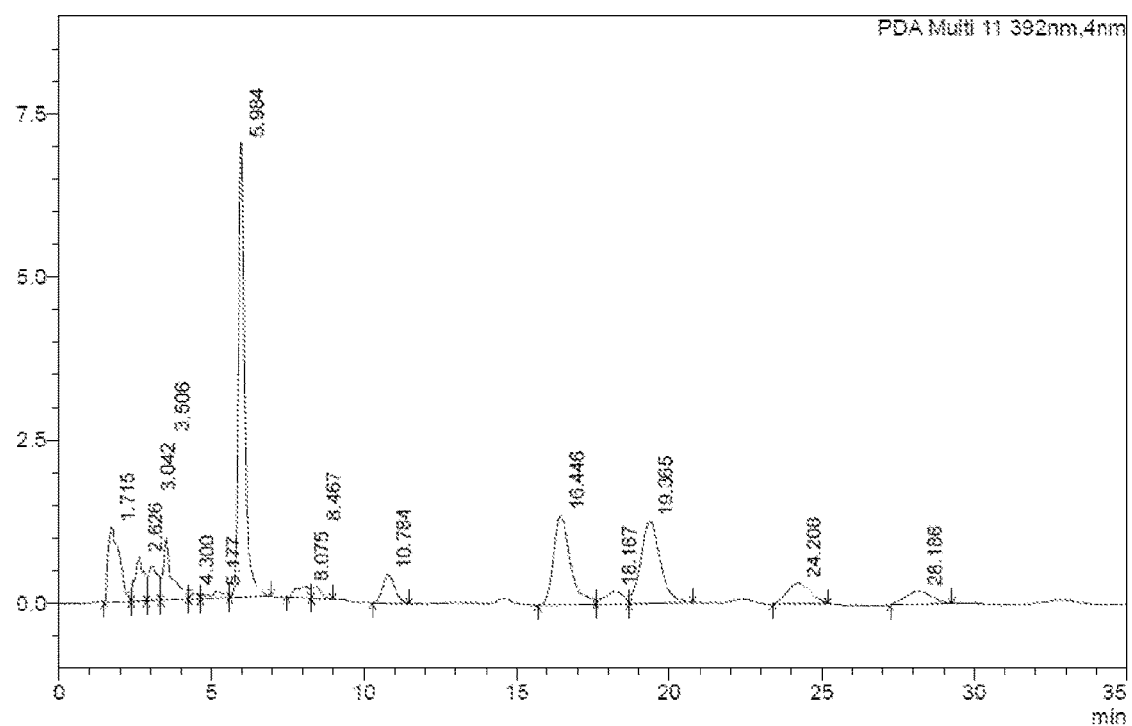

USE OF DIHYDROPORPHIN DERIVED FROM CHLOROPHYLL AS PLANT GROWTH REGULATOR

CROSS REFERENCE

This application is a U.S. National Phase of International Application No. PCT/CN2019/093380, filed Jun. 27, 2019.

TECHNICAL FIELD

The present invention relates to use of dihydroporphin derived from chlorophyll as a plant growth regulator and belongs to the field of plant growth regulator technologies.

BACKGROUND

In the process of plant growth, trace physiologically active substances, like sunlight, temperature, moisture and other nutrients, play an important role in plant growth. These trace active substances play a special role in regulating the growth and development of plants. Various endogenous trace active substances are often called plant hormones, such as auxin, gibberellin, cytokinin, etc., while non-endogenous additional active substances are called plant growth regulators. Most of the plant growth regulators currently used are synthetic compounds. In recent years, it has been gradually discovered that some products have varying degrees of adverse effects on the soil, plants, and even the food chain.

Therefore, looking for natural source plant growth regulators has become an important research direction and has been rapidly developed. The use of natural resources to prepare plant growth regulators is of great significance for the development of green pesticides, environmental protection, and sustainable agricultural development. Among them, porphin- or chlorin-based metal complexes derived from animals and plants have been proved to have strong plant growth regulating activities and good safety. In the early 1990s, it was discovered that the combination of porphyrin iron and a phosphate fertilizer could significantly promote the growth of crops (PLANT GROWTH PROMOTER, JP2306908A); in 2008, "一种含有氯化血红素的植物生长调节剂 (A plant growth regulator containing hemin)" (CN100428884C) was granted Chinese invention patent right; in 2013, Chinese patents "含有叶绿素及其水解产物的金属衍生物作为植物生长调节剂的应用 (Application of metal derivatives containing chlorophyll and its hydrolysate as plant growth regulator)" (CN102273467B) and "具有植物生长调节活性的二氢卟吩铁 (III) 螯合物及其作为植物生长调节剂的应用 (Iron chlorin e6 (III) chelates with plant growth regulating activity and its application as plant growth regulator)" (CN102285992B) were authorized. These porphins or chlorins are used in metal complexes, especially iron chelates, which is considered as an essential element. Except for heme, it is desirable that these products are used in the form of complexes/chelates which are prepared by adding iron to natural porphin-based compounds.

Porphin is a cyclic structure formed by tetrapyrrole, and chlorin (or dihydroporphin) is a product obtained by the hydrogenation of the double bond at positions 17 and 18 of the nucleus of porphin. Among them, the most important chlorin is a natural product derived from the decomposition of chlorophyll. Due to the diverse structures of the natural chlorophyll and the complex and various characteristics of the reaction products resulted from the change of conditions in the decomposition reaction, a variety of isomers exist in the chlorin product prepared by the decomposition of chlorophyll. The chlorin product often obtained has various structures, and more often a mixture of chlorin structures with different side chains is obtained. At present, chlorin is often used in the form of a metal complex/chelate for food colorings, photosensitizers, photo-activated pesticides and plant growth regulators. The application of chlorin directly as a product has not been reported.

SUMMARY OF THE INVENTION

Purpose of the invention: in order to solve the above technical problem, the present invention provides use of dihydroporphin derived from chlorophyll as a plant growth regulator.

Technical solution: in order to achieve the above purpose, the following technical solutions are adopted in the present invention:

Use of dihydroporphin derived from chlorophyll as a plant growth regulator.

The dihydroporphin derived from chlorophyll is one of or a mixture of more than one of pheophorbide, pyropheophorbide, chlorin e6, chlorin e4, chlorin f, purpurin-7, purpurin-18, chlorin p6, 15-formyl rhodochlorin, 15-oxymethyl rhodochlorin, 15-oxymethyl rhodochlorin lactone, 15-hydroxymethyl rhodochlorin, or 15-hydroxymethyl rhodochlorin lactone.

Alternatively, the dihydroporphin derived from chlorophyll is a mixture containing a plurality of dihydroporphin monomers obtained by decomposition of chlorophyll, or one or more of the dihydroporphin monomers obtained by further separating the mixture.

The dihydroporphin derived from chlorophyll can be obtained by common extraction and separation techniques, such as those in "有机化学 (Organic Chemistry)", 2011, 31(11): 1870-1877; 中草药 (Chinese Herbal Medicine), 1999, 08: 568-571.

Preferably, the method for decomposition of chlorophyll comprises the following steps:

extracting silkworm excrement in ethanol and collecting the extract; then adjusting the pH of the extract to a range from 10 to 11 and heating it for a saponification reaction, followed by cooling down and by removal of non-saponifiable matters; and collecting a lower layer of saponified liquid and adjusting its pH to a range from 3 to 5, then heating and keeping it at a temperature, removing the solvent, and cooling, washing, and drying the remainder, to obtain the mixture containing a plurality of dihydroporphin monomers (crude chlorin).

Preferably, the method for separation of the dihydroporphin monomers is as follows:

the mixture is mixed with an organic solvent, then filtered, and the filtrate is concentrated to obtain crude monomers; and the crude monomers are separated by a reversed-phase HPLC method by intercepting components at different retention times, so as to obtain various different dihydroporphin monomers.

Preferably, the dihydroporphin monomers include pheophorbide, pyropheophorbide, chlorin e6, chlorin e4, chlorin f, purpurin-7, purpurin-18, chlorin p6, 15-formyl rhodochlorin, 15-oxymethyl rhodochlorin, 15-oxymethyl rhodochlorin lactone, 15-hydroxymethyl rhodochlorin, 15-hydroxymethyl rhodochlorin lactone, or the like.

When the dihydroporphin derived from chlorophyll of the present invention is applied as a plant growth regulator, it can be applied in accordance with the common application methods for plant growth regulators, including, for example, spraying (aqueous solution), smearing (aqueous solution), seed soaking (aqueous solution), irrigating (aqueous solution) or broadcast sowing (solid powder), aerial spraying, ear soaking and the like, to the plant that needs to be regulated for growth or the environment in which the plant grows, to achieve the purpose of regulating the growth of the plant.

The concentration/content of the dihydroporphin derived from chlorophyll when being applied is 0.001 ppm-10 ppm, preferably 0.02 ppm-2 ppm.

A composition comprising the dihydroporphin derived from chlorophyll as described above can also be used as a plant growth regulator. The application method and the amount of the composition when being applied are similar to those as described above.

Technical effects: compared with the prior art, the present invention has the following advantages:
1) a novel plant growth regulator is provided;
2) the direct decomposition product of chlorophyll is used as the product, which is easier to prepare and process, and has a relatively simpler structure; and tedious reactions and preparations such as further chemical coordination/chelation/purification are eliminated, making the product more environmentally friendly and safer;
3) the product has a better solubility than the corresponding metal chelates and can be easily used, making it more convenient to be used in the fields;
4) the product has improved stability with stable quality assurance and a longer shelf life; and
5) the product is derived from a natural source, has a low effective dosage and is used in a small amount, which improves the utilization of silkworm excrement resources.

BRIEF DESCRIPTION OF THE DRAWINGS

FIG. 1: The HPLC spectrum of the mixture comprising a plurality of dihydroporphin monomers (crude chlorin) according to the present invention.

DETAILED DESCRIPTION

The present invention will be further illustrated below with reference to specific examples.

Example 1

(1) Preparation of the Crude Chlorin Product 100.0 g silkworm excrement was mixed with 600 ml ethanol to undergo extraction in a heated water bath for 2 hours at a temperature of 60° C., and then filtered; the filtrate was concentrated under reduced pressure to ⅓ of the original volume, added with 10% by mass of sodium hydroxide to adjust the pH to 10-11, kept at 60° C. for 3 hours for sufficient saponification reaction; the system was cooled down to room temperature, and extracted and purified with petroleum ether; an upper layer of unsaponifiable matters was removed, and a lower layer of saponified liquid was collected and extracted twice; the saponified liquid was added with 5% by mass of hydrochloric acid to adjust the pH to 4, slowly heated to 60° C., and kept at this temperature for half an hour, and then distilled under reduced pressure to remove ethanol; the system was cooled down to room temperature, and the remainder was washed twice with water, and dried under reduced pressure for 8 hours to obtain 3.2 g product of crude chlorin (a mixture containing a plurality of dihydroporphin monomers).

(2) Chromatographic Determination of Crude Chlorin Product

Instrument: Shimadzu LC-20AD high performance liquid chromatograph; chromatographic column: 250×4.6 mm, filled with C18, 5 μm packing; ultrasonic cleaner.

Reagents: methanol (chromatographically pure); acetonitrile (chromatographically pure); tetramethylammonium chloride (TMACL, analytical pure); disodium hydrogen phosphate dodecahydrate (analytical pure); phosphoric acid (analytical pure); water (GB/T6682-2008 Grade 3 water).

Preparation of phosphate buffer: 7.1628 g of disodium hydrogen phosphate dodecahydrate was weighed and ultrasonically dissolved in 300 mL of pure water in a 500 mL beaker. The solution was transferred to a 1 L volumetric flask, and the beaker was washed three times with a small amount of pure water, and the liquid from the washing was poured into the volumetric flask, and pure water was added to the volumetric flask to dilute the solution to volume. The pH was adjusted to 2.0 with phosphoric acid, and 2.192 g of tetramethylammonium chloride was added, ultrasonically dissolved, and the solution was filtrated by suction.

Sample solution: 0.02 g (accurate to 0.0002 g) crude chlorin was accurately weighed and put into a 20 mL volumetric flask, dissolved by adding methanol, ultrasonically treated in an ice bath for 3 minutes, and diluted to volume, 1 ml of the solution was transferred to a 100 ml volumetric flask, diluted to volume with methanol, and then 5 ml of the solution was transferred to a 100 ml volumetric flask, and diluted to volume with methanol. The whole process was kept from light.

Chromatographic Conditions:
Mobile phase: acetonitrile+phosphate buffer (pH 2.0) =50+50 (v/v)
Flow rate: 1.0 mL/min
Column temperature: 35° C.
Detection wavelength: 392 nm
Injection volume: 20 μL The determination results are shown in FIG. 1 which shows that under the chromatographic conditions determined by the present invention, the crude product contained more than 10 types of dihydroporphin monomers. Among them, the highest peak with a retention time of 5.984 is chlorin e6 (monomer).

(3) Determination of the Content of the Crude Chlorin Product:

Instrument: Shimadzu UV-2500pc UV spectrometer
Reagents: methanol (chromatographically pure), chlorin e6 (>=97%, HPLC area normalization method)

Standard curve: 0.0092 g of chlorin e6 monomer was accurately weighed and put into a 100 mL volumetric flask, dissolved by adding methanol, ultrasonically treated in an ice bath for 3 min, and diluted to volume to obtain a chlorin e6 standard mother solution with a concentration of 92 mg/L. The mother solution was diluted to a solution with a concentration C of 0.0002875-0.0046 mg/L, and the absorption value A of the solution was measured at 398 nm. The whole process was kept from light. The linear relationship between absorbance (A) and concentration (C) in the above concentration range was good, and a regression equation was obtained as $A=262.36*C-0.0193$ ($R^2=0.9994$). The standard curve was drawn with the concentration as the abscissa and the absorbance as the ordinate.

0.0124 g of chlorophyllin acid was accurately weighed and put into a 100 mL volumetric flask, dissolved by adding methanol and ultrasonically treated in an ice bath for 3 min, and diluted to volume; 10 mL of the solution was taken to a 100 mL volumetric flask, and diluted to volume to obtain a chlorophyllin solution with a concentration of 0.0124 g/L; the absorbance value was read and substituted into the linear regression equation for calculation. In the crude chlorin prepared in the present invention, the content of chlorin was 22.85% (calculated as chlorin e6).

Example 2. Corn Seed Germination Experiment

Test Method: Ministerial Standard NYT 2061.1-2011, Seed Soaking Method

Test samples: crude chlorin, and dihydroporphin monomers including chlorin fG, chlorin e6, pheophorbide, pyropheophorbide, chlorin e4, purpurin-7, purpurin-18, chlorin p6, 15-formyl rhodochlorin, 15-oxymethyl rhodochlorin, 15-oxymethyl rhodochlorin lactone A, 15-hydroxymethyl rhodochlorin, and 15-hydroxymethyl rhodochlorin lactone B, and pure water and iron chlorin e6 (China Pesticide Registration Certificate Number: PD20190031) were used as blank and positive control.

Preparation of Each Sample Solution:

10 mg of each sample was weighed and put into a 10 ml volumetric flask, dissolved with DMSO, and diluted to volume after being dissolved completely. 1 ml of each diluted monomer solution was put into a 50-1000 ml volumetric flask, added with water, blended and diluted to volume so as to prepare a solution with a concentration of 2 ppm, 0.2 ppm, or 0.02 ppm.

The determination results are shown in the table below

| Corn Seed Germination Rate for Each Sample Solution | | | |
|---|---|---|---|
| | Germination rate % | | |
| Sample | 0.02 ppm | 0.2 ppm | 2 ppm |
| Crude chlorin | 59 | 61 | 58 |
| Pheophorbide | 57 | 55 | 56 |
| Pyropheophorbide | 58 | 56 | 55 |
| Chlorin f | 55 | 66 | 58 |
| Chlorin e6 | 58 | 42 | 46 |
| Chlorin e4 | 57 | 55 | 48 |
| Purpurin-7 | 56 | 57 | 53 |
| Purpurin-18 | 55 | 58 | 53 |
| Chlorin p6 | 49 | 55 | 52 |
| 15-formyl rhodochlorin | 52 | 51 | 54 |
| 15-oxymethyl rhodochlorin | 56 | 52 | 52 |
| 15-oxymethyl rhodochlorin lactone | 54 | 66 | 58 |
| 15-hydroxymethyl rhodochlorin | 58 | 59 | 55 |
| 15-hydroxymethyl rhodochlorin lactone | 60 | 54 | 48 |
| Pure water | 38 | | |
| Iron chlorin e6 | 53 | 57 | 64 |

The results showed that as compared with the water control, the germination rate of the corn for each sample of the present invention at each concentration was significantly greater than that for the water control, and was similar to that for the positive control.

Example 3. Soybean Seed Germination Experiment

The method was substantially the same as that in Example 1 except that soybean seeds were used as the crop seeds, and the samples were crude chlorin, pyropheophorbide, chlorin f, chlorin e6, chlorin e4, purpurin-18, 15-oxymethyl rhodochlorin lactone, and 15-hydroxymethyl rhodochlorin lactone.

The experimental results are shown in the table below.

| Germination Rate of Soybean Seeds for Each Sample Solution | | | |
|---|---|---|---|
| | Germination rate % | | |
| Sample | 0.02 ppm | 0.2 ppm | 2 ppm |
| Crude chlorin | 65 | 66 | 66 |
| Pyropheophorbide | 61 | 67 | 65 |
| Chlorin f | 66 | 54 | 62 |
| Chlorin e6 | 60 | 59 | 60 |
| Chlorin e4 | 67 | 66 | 65 |
| Purpurin-18 | 66 | 65 | 67 |
| 15-oxymethyl rhodochlorin lactone | 58 | 58 | 60 |
| 15-hydroxymethyl rhodochlorin lactone | 68 | 60 | 62 |
| Pure water | 54 | | |
| Iron chlorin e6 | 60 | 66 | 56 |

The results showed that as compared with the pure water control, the germination rate of the soybean for each sample at each concentration was substantially greater than that for the pure water control. Among them, at 0.02 ppm, the monomer 15-hydroxymethyl rhodochlorin lactone had the best germination effect. At 0.2 ppm, the positive control iron chlorin e6 had the most ideal germination effect. At 2 ppm, chlorin f and 15-hydroxymethyl rhodochlorin lactone had better germination effects than the positive control. The sample of the present invention has a better soybean germination effect than the positive control iron chlorin e6 at a dilute concentration.

Example 4. Rice Seed Germination Experiment

The method was substantially the same as that in Example 2 except that rice seeds were used as the crop seeds.

The experimental results are shown in the table below.

| Germination Rate of Rice Seeds for Each Sample Solution | | | |
|---|---|---|---|
| | Germination rate % | | |
| Sample | 0.02 ppm | 0.2 ppm | 2 ppm |
| Crude chlorin | 77 | 77 | 76 |
| Pyropheophorbide | 73 | 74 | 72 |
| Chlorin f | 76 | 72 | 66 |
| Chlorin e6 | 70 | 74 | 68 |
| Chlorin e4 | 71 | 76 | 77 |
| Purpurin-18 | 77 | 78 | 76 |
| 15-oxymethyl rhodochlorin lactone | 72 | 76 | 70 |
| 15-hydroxymethyl rhodochlorin lactone | 72 | 74 | 68 |
| Pure water | 66 | | |
| Iron chlorin e6 | 78 | 76 | 74 |

The results in the above table show that as compared with the pure water control, the germination rate of the rice for each sample at each concentration was substantially greater than that for the pure water control. Among them, at 0.02 ppm, the positive control iron chlorin e6 had the best germination effect. At 0.2 ppm, the germination effect of 15-oxymethyl rhodochlorin lactone was similar to that of the positive control. At 2 ppm, the positive control iron chlorin e6 had the best germination effect.

Example 5. Wheat Seed Germination Experiment

The method was substantially the same as that in Example 2 except that wheat seeds were used as the crop seeds.

The experimental results are shown in the table below.

Germination Rate of Wheat Seeds for Each Sample Solution

| Sample | Germination rate % | | |
|---|---|---|---|
| | 0.02 ppm | 0.2 ppm | 2 ppm |
| Crude chlorin | 95 | 95 | 96 |
| Pyropheophorbide | 94 | 92 | 93 |
| Chlorin f | 94 | 88 | 92 |
| Chlorin e6 | 94 | 96 | 90 |
| Chlorin e4 | 93 | 98 | 97 |
| Purpurin-18 | 97 | 97 | 95 |
| 15-oxymethyl rhodochlorin lactone | 94 | 94 | 82 |
| 15-hydroxymethyl rhodochlorin lactone | 86 | 96 | 92 |
| Pure water | 82 | | |
| Iron chlorin e6 | 90 | 88 | 86 |

It can be seen from the results in the above table that as compared with the pure water control, the germination rate of the wheat for each sample at each concentration was substantially greater than that for the pure water control. Among them, at 0.02 ppm, chlorin f, chlorin e6 and 15-oxymethyl rhodochlorin lactone had the best germination effect, and they were better than the positive control iron chlorin e6. At 0.2 ppm, the germination effect of each sample was substantially higher than that of the positive control. At 2 ppm, most samples had better germination effect than the positive control.

Example 5. Determination of Seed Germination Rate for Monomer Chlorin e6 and Monomer Chlorin e6 Iron (III)

The method was substantially the same as that in Example 2, except that the test samples were monomer chlorin e6 and control monomer chlorin e6 iron (III), both at a concentration of 0.02 ppm and the test seeds were corn, soybean, rice and wheat seeds. The preparation method of the control monomer was conducted by referring to CN102273467B.

The experimental results are shown in the table below.

Comparison of Seed Germination Rate for the Monomers

| | Germination rate % | |
|---|---|---|
| Seed | Chlorin e6 | Chlorin e6 iron (III) |
| Corn | 58 | 46 |
| Soy bean | 66 | 60 |
| Rice | 76 | 58 |
| Wheat | 94 | 92 |

Conclusion: it can be seen from the above table that the germination rates of corn, soybean, rice and wheat for monomer chlorin e6 at 0.02 ppm were all better than those for the iron chelate monomer chlorin e6 iron (III).

As can be seen, the chlorin of the present invention has an excellent plant growth promotion effect, can exert a better effect especially at a lower concentration, which helps to reduce the used amount of the active ingredients, and has outstanding effects in plant metabolism and environmental protection.

Example 6. Experiment of Grape Ear Soaking for Crude Chlorin

Variety of the Grape: Kyoho, Venus seedless
Sample: crude chlorin, pure water (control)
Concentration: 0.1 g of crude chlorin was mixed with 10 ml of alcohol to be dissolved, added with water to 1000 ml and mixed homogeneously, and then 2 ml of the solution was taken and added with water to 5000 ml to prepare a solution with a concentration of 0.04 ppm.

Ear soaking treatment: on the 15th day after the flower had faded, the ears were put into the above solution contained in a small pot, and the ears were completely immersed for about 2 seconds. Same ears were treated with pure water in a similar way for the same time.

Results: the yield of Kyoho grape was increased by 21%, and the yield of Venus seedless grape was increased by 33% (as compared to those treated with pure water).

Example 7. Experiment of Aerial Spraying Crude Chlorin to Rice

Variety: rice seed Jinjing 18
Location: 3.3 mu of an irrigable land in Baotai Village, Taoxin Town, Wuhu County with fore-rotating rapeseed (2.6 mu of the land was sprayed with the sample solution, and 0.7 mu of the land with pure water)
Sample: crude chlorin, pure water (control)
Concentration: 0.1 g of crude chlorin was mixed with 10 ml of alcohol to be dissolved, added with water to 1000 ml and mixed homogeneously, and then 13 ml of the solution was taken and added with water to 26000 ml (26 liters) to prepare a crude chlorin solution with a concentration of 0.05 ppm.

Aerial spraying treatment: during a rice elongation stage, the above solution was sprayed twice, with 13 liters of the solution being carried each time by a CD-15 plant protection drone (Wuxi Hanhe Aviation Technology Co., Ltd.) flying at a speed of 5 meters per second and a height of about 1.5 meters, and sprayed to 2.6 mu of the land; and 7 liters of pure water was sprayed to 0.7 mu of the land at same speed and height as a control.

Results: compared with the land sprayed by pure water, the yield per mu of the land sprayed by the crude chlorin solution was increased by 11%, which was significantly better than the blank.

Example 8. Experiment of Seed Soaking and Spray Irrigation of Rice in Field

Variety: rice seed Jinjing 18
Location: an irrigable land in Baotai Village, Taoxin Town, Wuhu County with fore-rotating rapeseed, slight acidity and moderate fertility and having a total test area of about 3 mu, of which the area for the control was 0.5 mu.
Sample: crude chlorin, pure water (control)
Treatment: the experimental groups (2 groups) were a seed soaking-spraying group (1 mu) and an irrigation-spraying group (2 mu). Test methods: seed soaking: 1 kg of rice seeds were soaked in 2 liters of 0.5 ppm crude chlorin solution for 24 hours; irrigation: the crude chlorin sample was first prepared into a concentrated solution which was slowly added into the water inlet, and then water was injected to a required depth to achieve the final irrigation concentration; spraying: liquid surface spraying 1.0 ppm crude chlorin solution. Seed soaking-spraying group: soaking seeds and lifting seedlings, spraying the seedlings for the first time 10 days after transplanting the seedlings, spraying for the second time during the tillering stage, and spraying for the third time before flowering and booting, with about 30 liters of the solution per mu each time; irrigation-spraying group: spraying the seedlings for the first time 10 days after transplanting the seedlings, and irrigating once during the tillering stage (the sample amount was determined according to the area irrigation depth, so that the final concentration for the irrigation was about 0.002 ppm), spraying for the second time before flowering and booting, and the amount of each spraying was the same as above. Control group: treatment with pure water in the same way.

Effects: as compared to the control group, the seedlings from the seed soaking treatment were significantly different than those treated with pure water when being transplanted; the seedlings treated with seed soaking had a seedling height increased by 12.7% on average, a chlorophyll content increased by 9.1%, and a root length increased by 64.0%, indicating that the seed soaking had good effects.

The rice was harvested and weighed, and the yield per mu (dry rice yield per mu) was calculated. Control group: 577.2 kg; seed soaking-spraying group: 630.1 kg (yield increased by 9.2%); irrigation-spraying group: 618.5 kg (yield increased by 7.2%). The results show that seed soaking, spraying and irrigation with the samples of the present invention are all effective treatments for rice.

What is claimed:

1. A method of regulating plant growth, comprising applying dihydroporphin derived from chlorophyll to a plant that needs to be regulated for growth or an environment in which the plant grows.

2. The method according to claim 1, wherein the dihydroporphin derived from chlorophyll is one or more selected from the group consisting of pheophorbide, pyropheophorbide, chlorin e6, chlorin e4, chlorin f, purpurin-7, purpurin-18, chlorin p6, 15-formyl rhodochlorin, 15-oxymethyl rhodochlorin, 15-oxymethyl rhodochlorin lactone, 15-hydroxymethyl rhodochlorin, and 15-hydroxymethyl rhodochlorin lactone.

3. The method according to claim 1, wherein the dihydroporphin derived from chlorophyll is a mixture containing a plurality of dihydroporphin monomers obtained by decomposition of chlorophyll, or one or more of dihydroporphin monomers obtained by further separating the mixture.

4. A method of preparing dihydroporphin derived from chlorophyll, wherein the dihydroporphin derived from chlorophyll is a mixture containing a plurality of dihydroporphin monomers obtained by decomposition of chlorophyll, or one or more of dihydroporphin monomers obtained by further separating the mixture, wherein the decomposition of chlorophyll comprises steps of:

extracting silkworm excrement in ethanol and collecting the extract; then adjusting the pH of the extract to a range from 10 to 11 and then heating the extract for a saponification reaction, followed by cooling down and by removal of non-saponifiable matters; and collecting a lower layer of saponified liquid and adjusting its pH to a range from 3 to 5, then heating and keeping it at a temperature, removing the solvent, and cooling, washing, and drying the remainder, to obtain the mixture containing a plurality of dihydroporphin monomers.

5. The method according to claim 4, wherein the separation of the dihydroporphin monomers comprises:

mixing the mixture with an organic solvent, followed by filtering, and the filtrate is concentrated to obtain crude monomers; wherein the crude monomers are separated by a reversed-phase HPLC method by intercepting components at different retention times, so as to obtain various different dihydroporphin monomers.

6. The method according to claim 3, wherein the dihydroporphin monomer is selected from the group consisting of pheophorbide, pyropheophorbide, chlorin e6, chlorin e4, chlorin f, purpurin-7, purpurin-18, chlorin p6, 15-formyl rhodochlorin, 15-oxymethyl rhodochlorin, 15-oxymethyl rhodochlorin lactone, 15-hydroxymethyl rhodochlorin and 15-hydroxymethyl rhodochlorin lactone.

7. The method according to claim 1, comprising spraying, smearing, seed soaking, aerial spraying, ear soaking, irrigating or broadcast sowing, to a plant that needs to be regulated for growth or an environment in which the plant grows, to achieve the purpose of regulating the growth of the plant.

8. The method according to claim 1, wherein, when being applied, the dihydroporphin derived from chlorophyll is applied at a concentration or content of 0.001 ppm-10 ppm.

9. The method of claim 1, wherein, when being applied, the dihydroporphin derived from chlorophyll is applied at a concentration or content of 0.02 ppm-2 ppm.

* * * * *